May 15, 1951 R. A. GAISER ET AL 2,552,955
LAMINATED GLASS STRUCTURE
Filed July 14, 1950 2 Sheets-Sheet 1
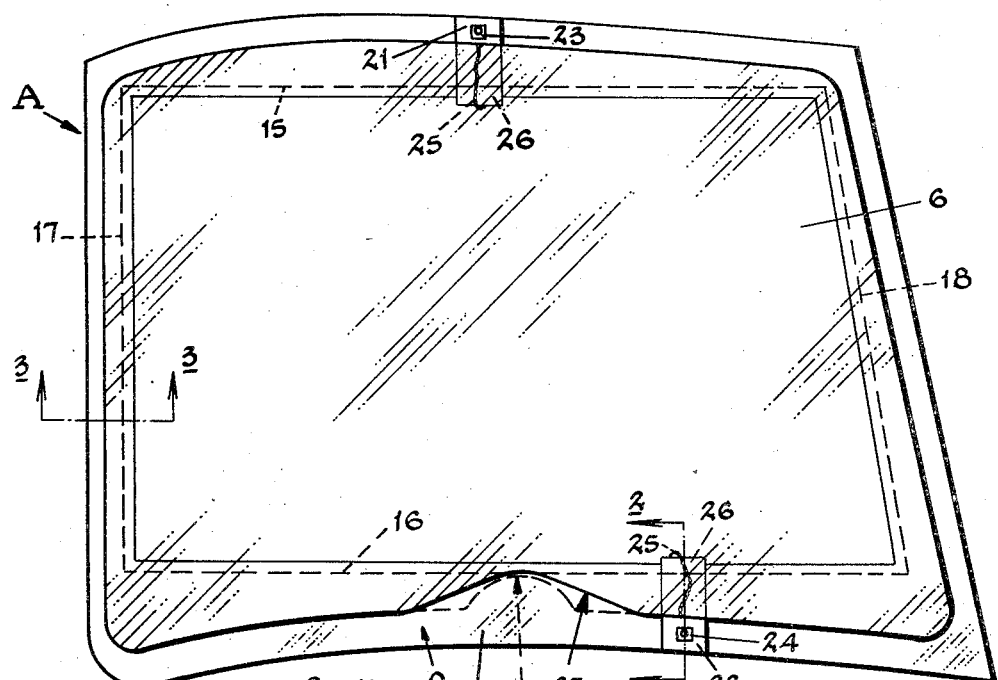
Fig. 1
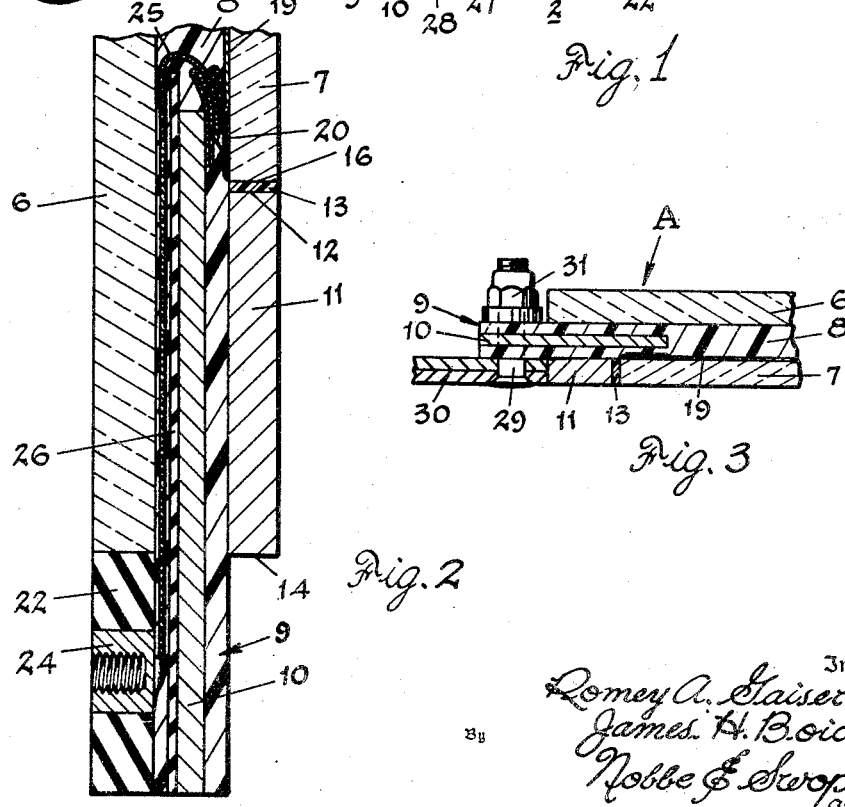
Fig. 2
Fig. 3
Inventors
Romey A. Gaiser and
James H. Boicey
By Nobbe & Swope
Attorneys May 15, 1951 R. A. GAISER ET AL 2,552,955
LAMINATED GLASS STRUCTURE
Filed July 14, 1950 2 Sheets-Sheet 2

Inventors
Romey A. Gaiser and
James H. Boicey
By Nobbe & Swope
Attorneys

Patented May 15, 1951

2,552,955

UNITED STATES PATENT OFFICE 2,552,955

LAMINATED GLASS STRUCTURE

Romey A. Gaiser and James H. Boicey, Toledo, Ohio, assignors to Libbey-Owens-Ford Glass Company, Toledo, Ohio, a corporation of Ohio Application July 14, 1950, Serial No. 173,765

9 Claims. (Cl. 219—19)

The present invention relates to improvements in laminated glass structures.

The type of laminated glass structure to which this invention more particularly relates comprises two sheets of glass and an interposed layer of non-brittle plastic adherent thereto to provide a composite structure and in which the surface of one glass sheet is coated with a transparent electrically conducting film. Such structures have come to be quite widely used in de-icing aircraft and other vehicles.

In use, the electrically conducting film on the glass sheet is supplied with sufficient electrical energy, through suitable electrodes secured to the glass and in electrical contact with the film, to heat the laminated structure to a temperature at which ice or frost will be removed from or its formation prevented on, the surface of the exposed face of the unit.

With de-icing glass units of this character, electrodes are provided which extend along the length of the marginal portions that are adjacent to opposite edges of the filmed glass sheet, and with uniformly filmed glass sheets of rectangular shape, this arrangement gives a uniform temperature throughout the areas of the film upon application of the required amount of electrical energy to the electrodes.

However, when uniformly filmed glass sheets that are not rectangular are supplied with electrical energy through electrodes arranged in the same way on the sheets, objectionably non-uniform heating of the structure results.

To illustrate, trapeziform shapes are frequently encountered in aircraft due to present-day demands for streamlined designs and, in those instances where two edges of the glass sheet are parallel and the other two edges are divergent for example, it is impossible to produce a uniform heating pattern when current is applied to the film. Thus, if the electrodes have been applied along the two divergent sides the area of the uniformly filmed glass where the diverging sides are closest together will become much hotter than the area of the glass where the diverging sides are further apart, when current is applied.

On the other hand, if the electrodes have been placed along the two parallel sides of the irregular sheet, excessively hot and cool areas will develop along the two divergent sides of the glass upon application of current.

Such non-uniform heating and the presence of alternate hot and cold areas are extremely objectionable, particularly in aircraft glazings. First, because the application of a normal amount of current to the unit will not bring the cooler areas to a temperature at which they will melt ice. Then too, attempts to raise the temperature of cooler areas, in order to overcome this condition, may so far overheat the other areas as to cause failure due to thermal shock resulting from excessive temperature differentials between the cool and hot areas. In addition, due to the excellent bond attained between the glass and plastic layers by the laminating process and the difference in coefficients of expansion between the glass and plastic, a failure of the glass-film bond and/or glass-glass bond may result from non-uniform heating.

Moreover, when the filmed glass sheet is combined with another sheet of glass and an interlayer of non-brittle plastic to form a laminated unit, as is usually the case in aircraft glazing, the hot areas in the film may cause overheating or bubbling of the plastic interlayer and thus seriously interfere with the normal stability of the lamination and possibly destroy its protective characteristics.

The above mentioned difficulties arising from the application of electrical energy to a non-rectangular filmed glass sheet were, in general, provoked by the extreme desirability of conforming the glazed openings to the streamlined contours of the aircraft or automotive vehicle. A substantially rectangular laminated glass structure, wherein the filmed glass sheet was of the same rectangular shape, failed to conform to the desired contour of the vehicle; while a non-rectangular laminated structure in which the filmed glass sheet was of the same general shape, that is resembled a trapezium in outline, presented the above-mentioned difficulties resulting from non-uniform heating.

A further consideration, related to the necessity of conforming the laminated glass structure to the contours of the airplane, and which is of importance in the construction of a laminated structure, concerns the desirability of providing a structure which is impact-resistant, free from vibration, and capable of withstanding pressure differentials between the inside and outside of the plane. Thus, the glass sheets comprising the inner and outer faces of the laminated structure must be of sufficient thickness to be "bird-resistant" and a flexible mounting must be provided whereby the structure will be "cushioned" against torsion and shock to which the plane is normally subjected in flight.

In addition, it is desirable that a laminated glass structure suitable for use in present-day aircraft be constructed whereby said structure is capable of withstanding pressure differentials and consequent outwardly directed strains on the glass sheets resulting from high altitude flying. Thus, in spite of recent developments directed toward equalizing the cabin and outer pressures, a considerable strain is still exerted on the glass sheets outwardly of the plane due to the greater pressure within the aircraft and this condition not infrequently has resulted in cracking of the glass sheets or even a "blow-out" of the laminated structure from the skin of the plane. To reduce to a minimum said cracking, the inner glass sheet of the present invention is of a size and shape conforming substantially to the irregular window opening and there is thereby provided an inner glass sheet of sufficient surface area to absorb said outwardly directed pressures.

Experience has indicated that when an inner glass sheet of the same size and shape as the substantially rectangular filmed glass sheet was provided, and a border of a suitable plastic material applied to the edges of said inner sheet to conform said sheet to the outline of the window opening, the inner glass sheet tended to bend outwardly of the plane and break away from the plastic border under pressure tests.

To substantially eliminate this difficulty, the inner glass sheet is of greater surface area and conforms generally to the outline of the irregular window opening and there is thereby provided a laminated glass structure which is capable of withstanding normal stresses and strains to which the structure is subjected in high altitude flights.

Thus, in the construction of a laminated glass structure suitable for use in present-day aircraft, in addition to other factors, the transparent electrical conductive film is preferably formed on a substantially rectangular sheet of glass, the laminated structure itself should conform to the contours of the plane, and the inner glass sheet of the laminated structure should be of sufficient size and shape whereby said inner sheet is capable of withstanding inner pressures directed outwardly of the plane.

It is therefore the principal object of this invention to provide a non-rectangular laminated glass structure wherein uniform heating is attained throughout the area of a substantially rectangular filmed glass sheet.

Another object of the invention is to provide a glazing for an irregular window opening comprising a non-rectangular laminated glass structure embodying two sheets of glass bonded together by an interposed layer of plastic material, the inner glass sheet substantially conforming to the irregular window opening and the outer glass sheet being substantially rectangular, and a transparent coating of electrically conductive material carried by said outer glass sheet.

Another object is the provision of a non-rectangular laminated glass structure wherein one sheet of glass conforms generally to the shape of the structure and the windshield opening and wherein the filmed glass sheet is substantially rectangular, the periphery of the filmed sheet being bordered by a filler ring, the outer circumference of which coincides with the outline of the opposite parallel glass sheet.

A further object of the invention is to provide a non-rectangular laminated glass structure which conforms generally to the irregular window opening and wherein the inboard light is of sufficient size and shape whereby cracking of said light caused by outwardly directed forces is substantially eliminated and wherein the outboard light is coated with a transparent electrically conductive film and bordered by a filler ring around the circumference thereof, said ring providing means whereby a substantially rectangular filmed glass sheet may be used in conjunction with a non-rectangular laminated glass structure.

Other objects and advantages of the present invention will become more apparent during the course of the following description when taken in connection with the accompanying drawings.

In the drawings, wherein like numerals are employed to designate like parts throughout the same:

Fig. 1 is a face view of the laminated glass structure of the invention;

Fig. 2 is a transverse section taken substantially along the line 2—2 of Fig. 1;

Fig. 3 is a transverse section taken substantially along the line 3—3 of Fig. 1;

Figure 4:
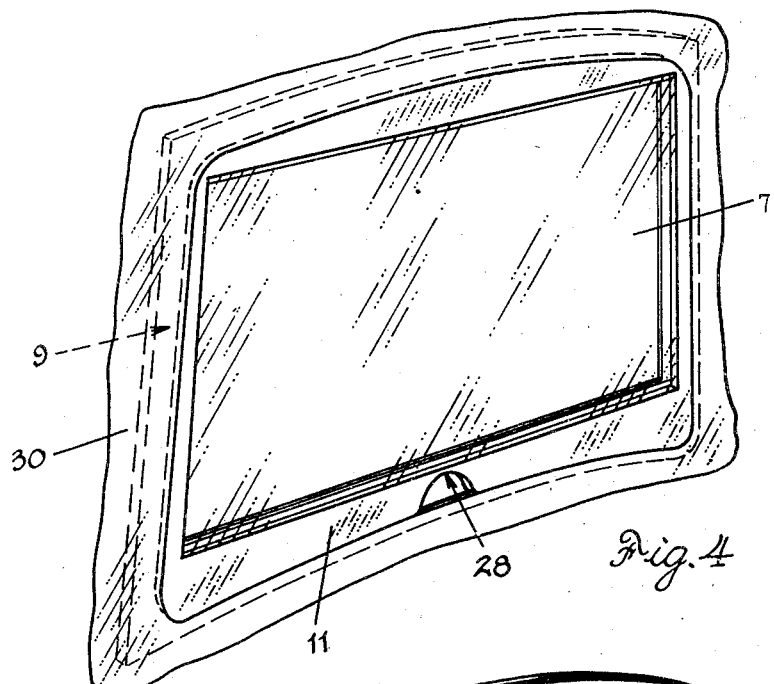
Fig. 4 is a fragmentary perspective view of the laminated glass structure mounted in a suitable opening.

Referring now more particularly to the drawings, there is shown in Fig. 1 a laminated glass structure A of a non-rectangular shape quite commonly encountered in aircraft glazing. It will be noted that the structure A shown, which is typical of present-day aircraft windshields, possesses an outline in which neither the side nor end edges are parallel.

As also shown in Fig. 2, the laminated structure comprises more specifically two sheets of glass 6 and 7 and an interposed layer of non-brittle plastic 8 bonded to the glass sheets to provide a unitary structure. The glass sheets may consist of ordinary plate or window glass and may be either fully tempered or semi-tempered. The plastic interlayer is preferably formed of synthetic resinous material such as, for example, polyvinyl butyral. However, different plastics varying in thickness and physical characteristics may be employed and the invention is not limited to the use of any particular resin.

It is to be noted that the glass sheets 6 and 7 are of lesser surface area than the plastic interlayer 8 so that the plastic interlayer extends beyond the edges of both glass sheets to provide a flexible attaching flange 9. It is desirable that the flange be reinforced by a flexible metal insert 10 embedded in the extended plastic. This metal insert may consist of a substantially flat, relatively thin ring or collar of preferably flexible metal such as, for example, aluminum, embedded in the extended plastic and projecting inwardly of, and coextensive with, the edges of the glass sheets.

Since the attaching flange provides means whereby the laminated glass structure A is anchored to the body of the plane, it is desirable that the flange be of a thickness whereby the structure A will blend into the contours of the plane upon attachment thereto. To accomplish this result the attaching flange 9 is preferably formed from a sufficient number of layers of plastic whereby the thickness of the attaching flange will be equal to that of the interlayer 8 or of a greater thickness, depending on the distance between the inner and outer surfaces of the wall or skin of the plane in which the structure A is to be mounted.

As has been noted above, efficient and uninterrupted operation of the filmed glass sheet 7 demands that the filmed sheet be as nearly rectangular as possible. To accomplish this, there is herein provided, as shown in Fig. 2, a substantially flat filler ring 11 adherent to the interposed plastic layer 8 and adjacent the ends and side edges of the glass sheet 7. This ring 11 may be of any suitable composition which is relatively hard and forms a laminated bond with the plastic interlayer 8. Such compositions may be, for example, methacrylate and phenolic resins, Masonite and glass.

As shown in Figs. 2 and 3, the inner edge 12 of the filler ring 11 abuts upon and is bonded to the end and side edges of the glass sheet 7 through the intermediary of a suitable plastic bonding material 13 such as, for example, polyvinyl butyral. In addition, the outer edge 14 of the ring 11 is coincident with and parallel to the edges of the opposite glass sheet 6. Thus it may seem that the area occupied by the glass sheet 6 is approximately equal to the area occupied by the combination of the filmed glass sheet 7 and the filler ring 11. By this means a laminated glass structure A is produced wherein the periphery of the inboard light or glass sheet 6 conforms to the size and shape of the irregular window opening, the outer edge 14 of the filler ring 11 conforms to the same opening, and at the same time the relatively smaller outboard light, or filmed glass sheet 7, is substantially rectangular and thereby assured of uniform heating.

Figure 5:
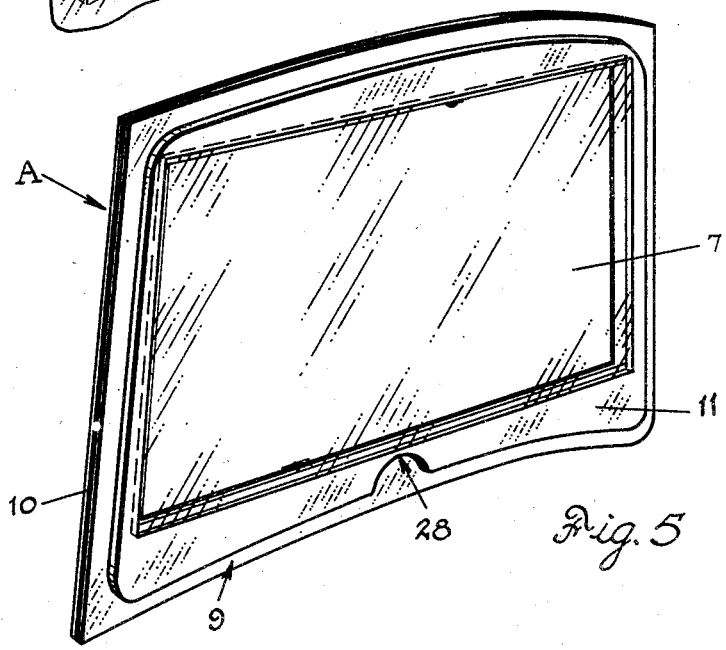
Fig. 5 is a perspective view of the laminated glass structure itself.

Thus it may be seen that the filmed glass sheet 7 is substantially rectangular while the laminated structure A itself is of an irregular shape. As is shown in Figs. 1 and 5, the filmed sheet has three relatively straight side and end edges, that is, the top edge 15 and bottom edge 16 are substantially parallel while one end edge 17 is perpendicular to the edges 15 and 16. Experience has indicated that uniform heating throughout the area of the filmed sheet 7 and efficient operation of the laminated structure A may be attained although the other end edge 18 is not exactly parallel to the opposite end edge 17.

The outboard light or glass sheet 7 carries a transparent electrically conducting film 19 of tin oxide which may be applied in a number of different ways, as by the method described in Patent No. 2,429,420, granted October 21, 1947, to H. A. McMaster. The film 19 carries electrodes 20 disposed longitudinally of the glass sheet 7 at the top edge 15 and bottom edge 16 thereof and extending substantially coextensively with these edges. The electrodes may be of any one of a number of different materials, which can be applied in any convenient manner. For example, electrodes of sprayed copper, sprayed copper alloy baked on gold, silver and platinum fluxes and combinations of these materials have all been used satisfactorily.

By means of a suitable resinous material there is bonded to the plastic interlayer 8 on the inboard side of the laminated structure A and to the marginal portions of the glass sheet 6 at points along the upper and lower edges thereof terminal blocks 21 and 22. These blocks may be of any suitable relatively hard composition and for this purpose Masonite and phenolite have proven quite successful. If desired, the terminal blocks may also be attached to the metal insert 10, as by rivets, or may be positioned in a vacated or cut-out portion of the metal insert.

Carried substantially centrally of the terminal blocks 21 and 22 by an appropriate resinous material are terminals 23, said terminals providing receiving means for any appropriate plug which carries electrical energy to the film 19. Connected to the bases of the terminals 23 and 24 are electrical wires 25. As shown in Fig. 2, these wires are preferably positioned adjacently parallel to the plastic interlayer 8 and insulated from the metal insert 10 by separators 26, which may be, for example, a phenolic or methacrylate resin, glass cloth or silicone rubber. The wires 25 preferably extend beyond the separators 26 and are suitably connected to the electrodes 20 carried by the film 19 on the glass sheet 7. If desired, one or more holes may be drilled in the metal insert 10 substantially centrally the length thereof and an insulated wire directed through said opening formed thereon.

In order to furnish an adequate opening along the lower marginal portion of the laminated glass structure A for the insertion of a suitable windshield wiper shaft, there is herein provided substantially centrally of the lower marginal portion of the inboard glass sheet 6 a wiper notch 27. As is shown in Fig. 1, this notch is preferably of gradually increasing slope with the greater slope present at substantially the central portion of the notch 27. This particularly shaped notch is preferred to a more severely curved opening, as when the notch resembles a half circle, in order to more evenly distribute the force exerted by pressure interior of the plane on the glass area surrounding the notch. That is, it has been found that a notch of the general shape indicated substantially eliminates any possibility of breakage of the glass sheet 6 along the lower marginal portion thereof by providing tapered, rather than relatively sharply protruding portions against which outwardly directed pressure is exerted.

As may be seen in Figs. 4 and 5, and by the dotted lines in Fig. 1, there is also provided a windshield wiper notch 28 substantially centrally of the lower marginal portion of the filler ring 11, adjacent the bottom edge 16 of the outboard glass sheet 7. It will be noted that this notch 28 possesses a sharper curvature; that is, more resembles a half circle than the substantially corresponding notch 27 in the inboard sheet 6. Inasmuch as the outboard notch 28 is formed out of the filler ring 11, rather than out of the glass sheet, as is the case with the notch in the inboard glass sheet 6, liability of breakage along the lower marginal portion is not present.

As has been noted, the laminated glass structure A when mounted in the windshield opening substantially conforms to the contours of the plane or other vehicle. To effect this desired conformation, the attaching flange 9 is preferably provided with suitably spaced holes through which may be inserted bolts or the like 29. As shown in Fig. 3, the bolts or the like preferably enter the wall or skin 30 of the plane and have threaded on their opposite ends suitable nuts or the like 31. Upon tightening the nuts on the bolts, the structure A blends into the contour of the plane and presents a streamlined appearance relative thereto. In place of bolts, any suitable clamping means may be used to attach the structure A to the plane.

If desired, in order to protect the edges of the inner glass sheet 6 during mounting in the windshield opening, as against a prying force, said edges may be lined with a thin strip of plastic material. The strip is preferably equal in width to the thickness of glass sheet 6 and may be applied around the periphery of the glass sheet by a suitable adhesive material.

In fabricating the laminated glass structure A, the glass and plastic laminations are first properly assembled with another to form a so-called "sandwich." This is done by positioning the layer of plastic forming the interlayer 8 between the glass sheets 6 and 7 with the filmed or coated surface of the glass sheet 7 preferably facing inwardly and lying adjacent the interlayer. As shown in Figs. 2 and 3, the reinforcing metal insert or collar 10 is properly positioned between the glass sheets and additional layers of plastic located adjacent said metal insert to build up a thickness thereof substantially equal to the thickness of the plastic layer 8 interposed between the glass sheets 6 and 7.

The terminal blocks 21 and 22 are then preferably positioned in locations approximating those indicated in Fig. 1 and the electrical wires 25, which are attached to the electrodes 20 on the film 19 and carry electrical current thereto, are suitably connected to the bases of the terminals 23. Insulating spacers or separators 26 may next be located adjacently parallel the electrical wires 25 and reinforcing metal insert 10 and interposed therebetween to prevent short-circuiting.

The substantially flat filler ring 11 is then positioned on the outboard side of the structure A parallel to and abutting upon the plastic interlayer 8. In order to properly unite the filler ring and filmed glass sheet 7, a relatively thin strip of a suitable plastic bonding material 13 is next located between the inner edge 12 of the ring and the top edge 15, bottom edge 16 and end edges 17 and 18 of the glass sheet 7, as may be seen in Figs. 2 and 3. As has been noted, the ring 11 is preferably fabricated whereby the outer edge 14 thereof substantially conforms to the outline of the structure A and coincides with the periphery of the glass sheet 6 lying parallel thereto.

As thus assembled, there is present between the laminations undesirable air, moisture, and/or gas which must be removed in order that an efficient bond may be attained in the final compositing operation. It is therefore desirable to drive out the excess air and moisture by passing the assembly between one or more pairs of semi-resilient pressing rollers after which the structure A as thus far assembled may be arranged within a flexible container, air evacuated therefrom, and the container and contents subjected to heat and pressure sufficient to effect the final bonding.

As thus produced the laminated glass structure A is ready for use and may be installed in any suitable type mounting. The structure A is adapted to any vehicle in which efficient de-icing is the ultimate object and, among other factors, wherein conformation of the structure A to the contours of the vehicle and a non-rectangular window opening are deemed essential.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In a glazing for an irregular window opening, a non-rectangular laminated glass structure comprising two sheets of glass bonded together by an interposed layer of plastic material, the inner glass sheet substantially conforming to the irregular window opening and the outer glass sheet being substantially rectangular, and a transparent coating of electrically conductive material carried by said outer glass sheet.

2. In a glazing for an irregular window opening, a non-rectangular laminated glass structure comprising two sheets of glass bonded together by an interposed layer of plastic material, the inner glass sheet substantially conforming to the irregular window opening and the outer glass sheet being relatively smaller and substantially rectangular, a transparent coating of electrically conductive material carried by said outer glass sheet, and electrodes arranged along two opposite marginal edges of the outer glass sheet in contacting relation with the electrically conductive coating for transmitting current thereto.

3. In a glazing for an irregular window opening, a non-rectangular laminated glass structure comprising two sheets of glass bonded together by an interposed layer of plastic material, the inner glass sheet substantially conforming to the irregular window opening and the outer glass sheet being relatively smaller and substantially rectangular, a transparent coating of electrically conductive material carried by said outer glass sheet, and means surrounding the outer glass sheet and shaped to conform substantially to the outline of the inner glass sheet.

4. In a glazing for an irregular window opening, a non-rectangular laminated glass structure comprising two sheets of glass bonded together by an interposed layer of plastic material, the inner glass sheet substantially conforming to the irregular window opening and the outer glass sheet being relatively smaller and substantially rectangular, said interposed plastic layer extending beyond the edges of the inner glass sheet to provide means for attaching the structure within the window opening, a transparent coating of electrically conductive material carried by the outer glass sheet, and filler means carried by the plastic interlayer in surrounding relation to the outer glass sheet and having an irregular outline conforming to and coextensive with the outline of the inner glass sheet.

5. In a glazing for an irregular window opening, a substantially non-rectangular laminated glass structure comprising two sheets of glass bonded together by an interposed layer of plastic material, the inner glass sheet substantially conforming to the irregular window opening and the outer glass sheet being relatively smaller and substantially rectangular, said interposed plastic layer extending beyond the edges of the glass sheets to provide means for attaching the structure within the window opening, a metallic member embedded within the extended portion of the plastic interlayer and coextensive with the edges thereof, a transparent coating of electrically conductive material carried by the outer glass sheet, and filler means carried by the plastic interlayer in surrounding relation to the outer glass sheet and having an irregular outline conforming to and coextensive with the outline of the inner glass sheet.

6. In a glazing for an irregular window opening, a substantially non-rectangular laminated glass structure comprising two sheets of glass bonded together by an interposed layer of plastic material, the inner glass sheet substantially conforming to the irregular window opening and the outer glass sheet being relatively smaller and substantially rectangular, said interposed plastic layer extending beyond the edges of the glass sheets to provide means for attaching the structure within the window opening, a metallic member embedded within the extended portion of the plastic interlayer and coextensive with the edges thereof, a transparent coating of electrically conductive material carried by the outer glass sheet, means contacting the electrically conductive coating for transmitting current thereto, and filler means carried by the plastic interlayer in surrounding relation to the outer glass sheet and having an irregular outline conforming to and coextensive with the outline of the inner glass sheet.

7. In a glazing for an irregular window opening, a substantially non-rectangular laminated glass structure comprising two sheets of glass bonded together by an interposed layer of plastic material, the inner glass sheet substantially conforming to the irregular window opening and the outer glass sheet being substantially rectangular, said interposed plastic layer extending beyond the edges of the glass sheets to provide means for attaching the structure within the window opening, a substantially flat metallic collar embedded within the extended portion of the plastic interlayer coextensive with the edges thereof and extending inwardly of the edges of the glass sheets, and a transparent coating of electrically conductive material carried by the outer glass sheet.

8. In a glazing for an irregular window opening, a substantially non-rectangular laminated glass structure comprising two sheets of glass bonded together by an interposed layer of plastic material, the inner glass sheet substantially conforming to the irregular window opening and the outer glass sheet being relatively smaller and substantially rectangular, said interposed plastic layer extending beyond the edges of the glass sheets to provide means for attaching the structure within the window opening, a substantially flat metallic collar embedded within the extended portion of the plastic interlayer coextensive the edges thereof and extending inwardly of the edges of the glass sheets, a transparent coating of electrically conductive material carried by the outer glass sheet, and a substantially flat filler ring carried by the plastic interlayer in surrounding relation to the outer glass sheet and having an irregular outline conforming to and coextensive with the outline of the inner glass sheet.

9. In a glazing for an irregular window opening, a substantially non-rectangular laminated glass structure comprising two sheets of glass bonded together by an interposed layer of plastic material, the inner glass sheet substantially conforming to the irregular window opening and the outer glass sheet being relatively smaller and substantially rectangular, said interposed plastic layer extending beyond the edges of the glass sheets to provide means for attaching the structure within the window opening, a substantially flat metallic collar embedded within the extended portion of the plastic interlayer coextensive the edges thereof and extending inwardly of the edges of the glass sheets, a transparent coating of electrically conductive material carried by the outer glass sheet, electrodes carried along two opposite marginal edges of the outer glass sheet and contacting the electrically conductive coating to transmit current thereto, and a substantially flat filler ring carried by the plastic interlayer in surrounding relation to the outer glass sheet and having an irregular outline conforming to and coextensive with the outline of the inner glass sheet.

ROMEY A. GAISER.
JAMES H. BOICEY.

REFERENCES CITED

The following references are of record in the file of this patent:

UNITED STATES PATENTS

| Number | Name | Date |
|---|---|---|
| 1,777,343 | Wilson | Oct. 7, 1930 |
| 2,173,263 | Nier | Sept. 19, 1939 |
| 2,392,129 | Downes | Jan. 1, 1946 |
| 2,490,433 | Gunning et al. | Dec. 6, 1949 |
| 2,497,507 | McMaster | Feb. 4, 1950 |
| 2,507,036 | McCrumm et al. | May 9, 1950 |